United States Patent
Eberhardt et al.

(10) Patent No.: US 7,930,083 B2
(45) Date of Patent: Apr. 19, 2011

(54) METHOD OF CONTROLLING BEAM PROJECTION OF HEADLIGHTS OF A MOTOR VEHICLE

(75) Inventors: Stefan Eberhardt, Backnang (DE); Dirk Brinkmann, Wiernsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 1049 days.

(21) Appl. No.: 11/732,806

(22) Filed: Apr. 4, 2007

(65) Prior Publication Data

US 2007/0230199 A1   Oct. 4, 2007

(30) Foreign Application Priority Data

Apr. 4, 2006   (DE) .................... 10 2006 016 071

(51) Int. Cl.
*G05D 1/00*   (2006.01)
(52) U.S. Cl. .............. 701/49; 701/28; 701/36
(58) Field of Classification Search .............. 340/10.1, 340/5.1, 3.1, 500; 701/28, 49, 36; 362/460, 362/549, 543; 180/162
See application file for complete search history.

(56) References Cited

U.S. PATENT DOCUMENTS

| | | | |
|---|---|---|---|
| 6,817,740 B2 | 11/2004 | Kobayashi et al. | |
| 7,124,008 B2 * | 10/2006 | Brun et al. ............... | 701/49 |
| 2002/0080618 A1 | 6/2002 | Kobayashi et al. | |
| 2007/0025112 A1 | 2/2007 | Kuhl et al. | |

FOREIGN PATENT DOCUMENTS

| | | |
|---|---|---|
| DE | 197 13 884 A1 | 10/1998 |
| DE | 199 02 015 A1 | 7/2000 |
| DE | 101 64 193 A1 | 7/2002 |
| DE | 102 54 806 A1 | 6/2004 |
| DE | 103 36 681 B4 | 7/2005 |
| DE | 10 2004 006 133 A1 | 9/2005 |
| DE | 10 2004 033 705 A1 | 2/2006 |
| EP | 1 515 293 A1 | 3/2005 |
| JP | 2000-318513 | 11/2000 |

* cited by examiner

Primary Examiner — Vernal U Brown

(57) ABSTRACT

A method for traffic-dependent control of beam projection of headlights of motor vehicles requires the passing of images from at least two image recording units to a control unit for evaluation. A road profile is generated as a three-dimensional image by reference to the images from the at least two image recording units so that predictive control of the vehicle lighting is carried out on a basis of the determined road profile.

5 Claims, 2 Drawing Sheets

METHOD OF CONTROLLING BEAM PROJECTION OF HEADLIGHTS OF A MOTOR VEHICLE

CROSS-REFERENCE TO RELATED APPLICATION

This application claims the priority, under 35 U.S.C. §119, of German application DE 10 2006 016 071.1-42, filed Apr. 4, 2006; the prior application is herewith incorporated by reference in its entirety.

BACKGROUND OF THE INVENTION

Field of the Invention

The invention is based on a device for adapting the lighting system in a motor vehicle, such as is known, for example, from published, non-prosecuted German patent application DE 199 02 015 A1. In the device which is known from the latter, an image recording device is connected to an image evaluation device, wherein the lighting system is actuated and the beam projection is changed by an adjustment device on the basis of the recorded images.

SUMMARY OF THE INVENTION

It is accordingly an object of the invention to provide a method for controlling beam projection of headlights of a motor vehicle which overcome the above-mentioned disadvantages of the prior art methods of this general type, in which a control of the light function in the vehicle is performed in a predictive fashion taking the known systems as a starting point.

With the foregoing and other objects in view there is provided, in accordance with the invention, a method for traffic-dependent control of beam projection of headlights in motor vehicles. The method includes providing images from at least two image recording units to a control unit for evaluation; generating a road profile as a three-dimensional image from the images of the at least two image recording units; detecting at least one of a marking of a roadway and edges of the roadway during the generating of the road profile step; comparing the road profile and further sensed light sources, including lights of traffic ahead and oncoming traffic, for plausibility; determining if the further sensed light sources are relevant light sources or irrelevant light sources; and carrying out further control of the beam projection on a basis of a differentiation between the relevant light sources and the irrelevant light sources.

A further advantage is to improve the lighting in bends through the predictive activation and the matching actuation at the entry to a bend or exit from a bend. With the function according to the invention it is also possible to illuminate in an improved fashion bend shapes such as an S bend which have previously been difficult to negotiate. The inventive lane detection for controlling the beam projection of the headlight of the motor vehicle also has the advantage that significantly better identification and differentiation of light sources on or next to the carriageway is ensured.

In accordance with an added mode of the invention, there are the further steps of classifying a light source position which appears to be located underneath the roadway as an irrelevant light source; recording a light source located above the roadway as a relevant light source; and not taking into account the irrelevant light sources for an actuation of the headlight.

In accordance with a further mode of the invention, there is the step of carrying out predictive activation of the headlights in bends when a bend is detected.

In accordance with an additional mode of the invention, there is the step of setting a low beam light lower and tangent to an upper edge of bump forms when bumps in the road profile are detected.

In accordance with an additional mode of the invention, there is the step raising a low beam light until a section of a roadway leading out of a depression is fully illuminated when depressions are detected.

Other features which are considered as characteristic for the invention are set forth in the appended claims.

Although the invention is illustrated and described herein as embodied in a method for controlling beam projection of headlights of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
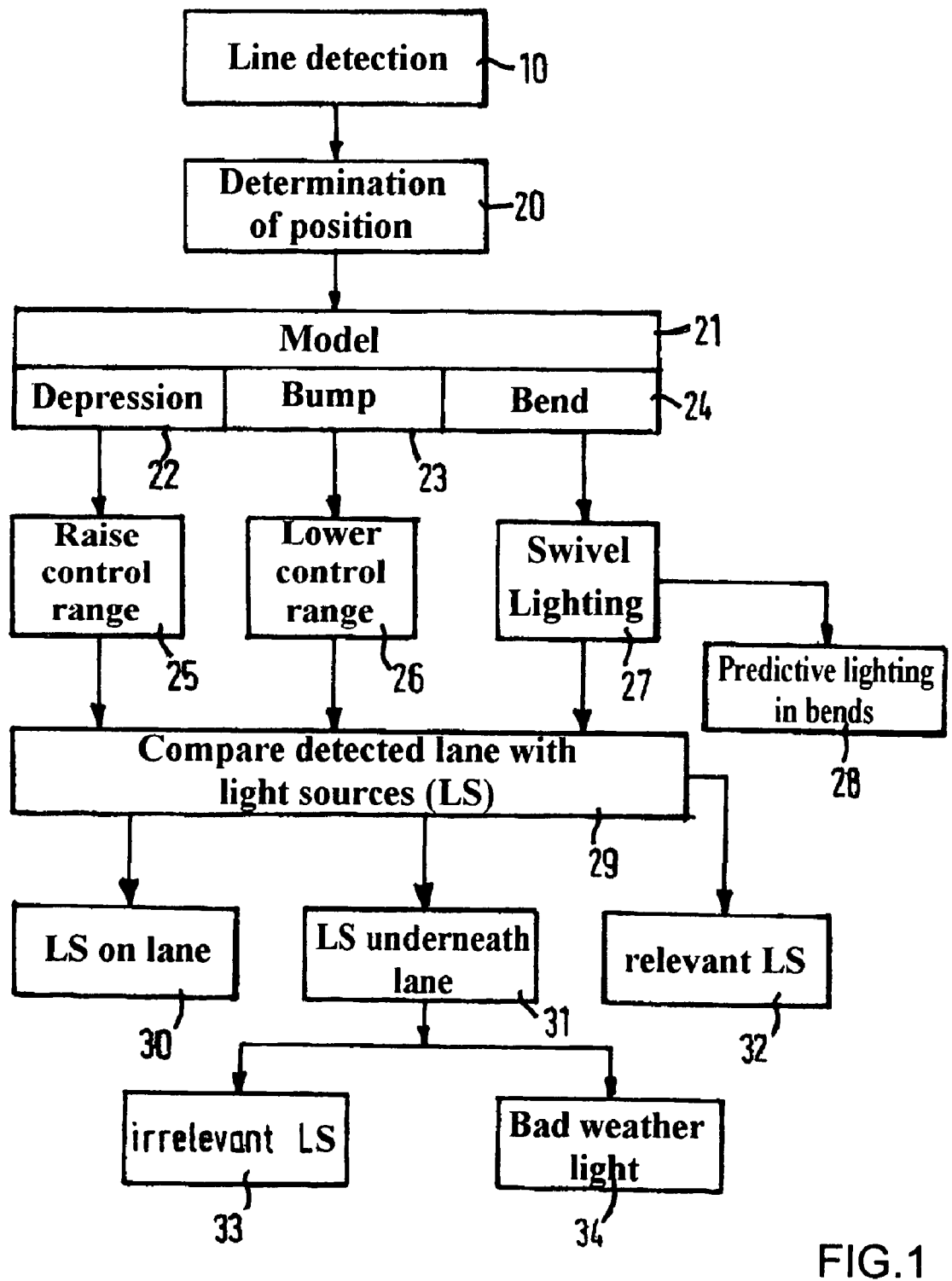
FIG. 1 is a block flow diagram showing a lane detection methodology according to the invention.

Referring now to the figures of the drawing in detail and first, particularly, to FIG. 1 thereof, there is shown a block diagram for lane detection. At least two cameras are used which interact as a stereo camera so that through an evaluation of images of the at least two cameras, a spatial and thus three-dimensional image, can be generated for further evaluation in a non-illustrated control unit. The positions of various light sources, and in particular the evaluation of a lane profile or road profile on which the motor vehicle is moving, can thus advantageously be carried out better by the embodiment according to the invention.

FIG. 1 shows the lane detection methodology according to the invention. Here, in a first step 10, the images of the at least two cameras are first each recorded individually and a precise determination of positions of markings of the roadway is carried out so that on this basis line detection is carried out in order to generate a two-dimensional image.

The detected lines form the basis for the determination of a three-dimensional image in the following operation 20. The three-dimensional image then indicates the spatial arrangement of the recorded lane with respect to the vehicle. On the basis of the three-dimensional image and the information which is determined in this way, the profile of the roadway with its elevations, bends, bumps and, for example, also depressions, is modeled in a subsequent method step 21 and the plane of the roadway is projected into the roadway profile.

These various possibilities are indicated in the method step 21 symbolically with the three data items of depression 22, bump 23 and bend 24.

If a depression is detected after the modeling of the roadway profile, the control range of the headlight is subsequently expanded in step 25. Therefore the light beam, and thus the detection boundary, can be raised where necessary.

If, on the other hand, a bump is detected in the roadway profile lying ahead in step 23, the control range is expanded downwards, which results in that the headlight is, when necessary, set tangentially to the bump. Without the lowering, the light of the headlight would not be directed at the roadway, and would therefore not be reflected by it but rather be lost outside the roadway.

Finally, by modeling the roadway profile it is also possible to detect a bend, which results in that in step 27 the low beam light is correspondingly swiveled so as to follow the roadway profile, which is illustrated by the step 28 as predictive lighting in bends.

Finally, in step 29 light sources are evaluated. All the light sources which are determined and recorded by the cameras are thus checked for plausibility of the lane profile with the light source positions. In this way it is possible to distinguish between relevant and irrelevant light sources. The operational step 29, which follows the detection of the various roadway profiles, once more tests the various lane and light source positions for plausibility. Therefore the roadway profile is determined by reference to the camera images, and that the recorded light sources, such as, for example, light posts next to the roadway lane, the light of the oncoming traffic or traffic ahead on the lane are compared with this determined roadway profile. It is then possible, as already mentioned, for plausibility testing to be carried out. If there are corresponding deviations it is appropriate to assign the higher priority to the light source detection and to switch to a standard control system for the "level" range.

It is determined whether a light source is present which is, for example, diffusely reflecting on the roadway, as documented by step 30, whether the light source present has a mirroring effect underneath the roadway, as documented in step 31, or whether a relevant light source is present which is detected as oncoming traffic, and is thus above the roadway. The relevant light source is sensed as such in operational step 32. The detection of a light source on or underneath the roadway permits an assessment as to whether the sensed light source is an irrelevant light source which does not have to be taken into account for the actuation of the headlight. Only the detection of a light source underneath the roadway makes it possible to infer that the light of oncoming vehicles or the illumination at the edge of the road is reflected in the surface of the roadway, for example because the roadway is wet. In this case, when a light source is detected underneath the roadway it is possible to switch over to the bad weather light, as is specified in operational step 34.

The function of lane detection is embedded in a superordinate program for variable control of the beam projection. The aim with variable control of the beam projection is to illuminate the region in front of the vehicle in an optimum way without dazing the oncoming traffic or the traffic ahead.

Predictive control has the advantage that, for example, the lighting in a bend is improved by the predictive activation and the matching actuation at the entry to a bend and the exit from a bend as well as in particular critical S bends.

Lowering the low beam light before a bump, even without traffic ahead or oncoming traffic, provides the advantage that the maximum quantity of light is directed onto the roadway in front of the driver.

Differentiating relevant and irrelevant light sources provides the advantage that incorrect settings are avoided and a reflective roadway surface is also detected, which permits the inference that the roadway surface is wet and then leads to a further new function of the so-called bad weather light being switched on.

The use of two cameras for identifying relevant light sources ultimately provides the advantage that the reliability of the light source detection is increased, and the comfort and the reliability are thus improved.

Figure 2:
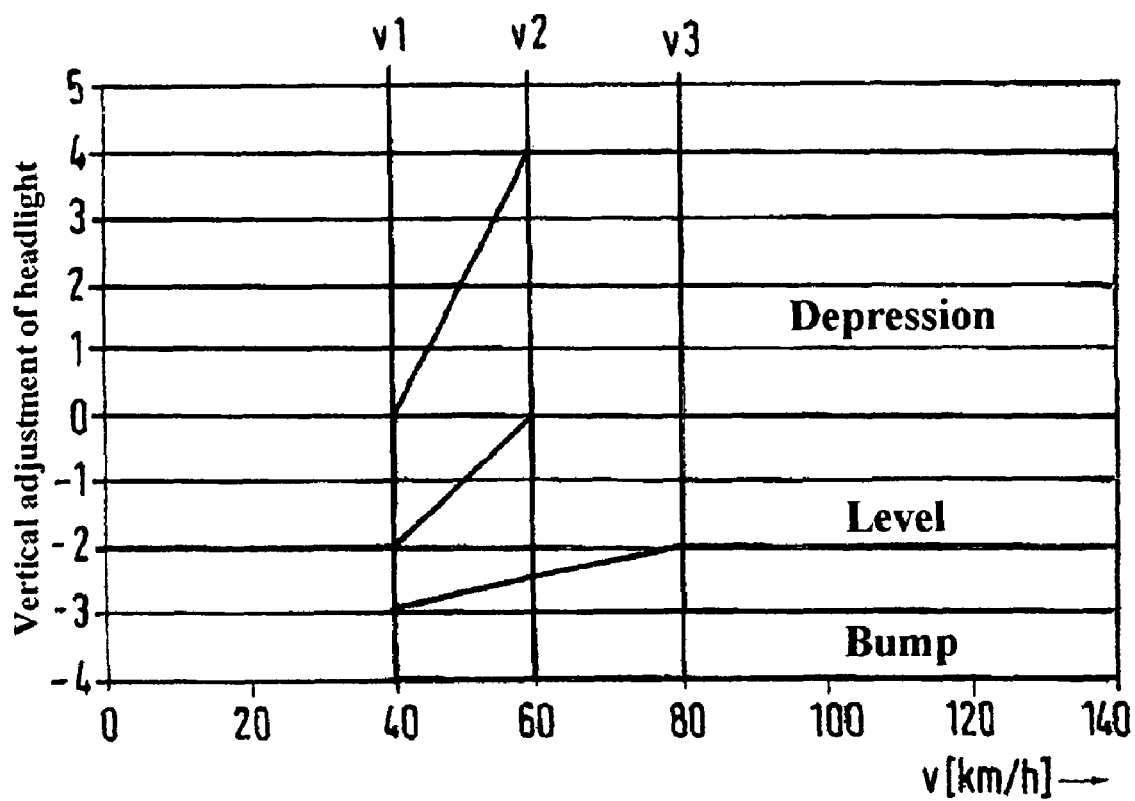
FIG. 2 is a graph illustrating a relationship between speed and setting of beam projection.

FIG. 2 shows once more as a diagram the relationship between speed and setting of the beam projection. There is still no traffic-dependent control of the beam projection below a first reference value v1, as is also apparent from FIG. 2. Above the first reference value there is a first region in which the setting of the beam projection is selected such that when a bump is detected the headlight has the smallest beam width or projection. This is adjoined by the control range for the level at which the headlight is located substantially below the position of rest or zero setting. FIG. 2 shows that this is adjoined by the controllable beam projection for a depression and the full beam has the largest beam width or projection, in which case it is clear that the full beam is only to be switched on at high speeds. In the speed range between the first and second predefinable reference values, the beam width or projection is first smaller for all cases and becomes larger as the speed increases, while the beam projection has a constant value above the speed v2, of course depending on the setting range.

We claim:

1. A method for traffic-dependent control of beam projection of headlights in motor vehicles, which comprises the steps of:

providing images from at least two image recording units to a control unit for evaluation;

generating a road profile as a three-dimensional image from the images of the at least two image recording units;

detecting at least one of a marking of a roadway and edges of the roadway during the generating of the road profile step;

comparing the road profile and further sensed light sources, including lights of traffic ahead and oncoming traffic, for plausibility;

determining if the further sensed light sources are relevant light sources or irrelevant light sources; and carrying out further control of the beam projection of the headlights of the motor vehicle on a basis of a differentiation between the relevant light sources and the irrelevant light sources.

2. The method according to claim 1, which further comprises:

classifying a light source position which appears to be located underneath the roadway as an irrelevant light source;

recording a light source located above the roadway as a relevant light source; and not taking into account the irrelevant light sources for an actuation of the headlight.

3. The method according to claim 1, which further comprises carrying out predictive activation of the headlights in bends when a bend is detected.

4. The method according to claim 1, which further comprises setting a low beam light lower and tangent to an upper edge of bump forms when bumps in the road profile are detected.

5. The method according to claim 1, which further comprises raising a low beam light until a section of a roadway leading out of a depression is fully illuminated when depressions are detected.

* * * * *